(12) United States Patent
Klipfel et al.

(10) Patent No.: US 9,045,997 B2
(45) Date of Patent: Jun. 2, 2015

(54) ACTUATOR FOR A WASTEGATE OR A VARIABLE TURBINE GEOMETRY DEVICE AND METHOD OF ACTUATION

(75) Inventors: Bernhard Klipfel, Karlsruhe (DE); Christoph Thiery, Mannheim (DE); Arthur Janik, Oftersheim (DE)

(73) Assignee: Halla Visteon Climate Control Corporation, Daejeon-Si (KR)

(*) Notice: Subject to any disclaimer, the term of this patent is extended or adjusted under 35 U.S.C. 154(b) by 183 days.

(21) Appl. No.: 13/208,266

(22) Filed: Aug. 11, 2011

(65) Prior Publication Data

US 2012/0036950 A1 Feb. 16, 2012

(30) Foreign Application Priority Data

Aug. 12, 2010 (EP) .................................. 10172629

(51) Int. Cl.
| | | |
|---|---|---|
| F01D 17/10 | (2006.01) | |
| F02B 37/18 | (2006.01) | |
| F02B 37/24 | (2006.01) | |
| F16H 53/08 | (2006.01) | |

(52) U.S. Cl.
CPC ......... *F01D 17/105* (2013.01); *Y10T 74/18312* (2015.01); *F16H 53/08* (2013.01); *F02B 37/186* (2013.01); *F02B 37/24* (2013.01); *F05D 2220/40* (2013.01); *F05D 2260/57* (2013.01); *F05D 2260/606* (2013.01); *F05D 2260/79* (2013.01); *Y02T 10/144* (2013.01)

(58) Field of Classification Search
CPC ...... F01D 17/105; F02B 37/186; F02B 37/24; F16H 25/12
USPC ............. 74/55, 56, 57, 25; 415/150, 159, 160
See application file for complete search history.

(56) References Cited

U.S. PATENT DOCUMENTS

| | | | |
|---|---|---|---|
| 2,567,856 A * | 9/1951 | Polk ................................ | 29/76.1 |
| 2,646,100 A * | 7/1953 | Gibson ............................ | 74/56 |
| 3,101,622 A * | 8/1963 | Johnson et al. ............... | 74/89.16 |
| 3,190,628 A * | 6/1965 | Litzka ............................ | 266/64 |
| 3,334,829 A * | 8/1967 | Fisher et al. ................. | 242/483.7 |
| 3,881,398 A * | 5/1975 | Gravagne ...................... | 409/281 |
| 4,251,050 A | 2/1981 | McInerney | |
| 4,796,430 A * | 1/1989 | Malaker et al. ..................... | 62/6 |
| 4,834,033 A * | 5/1989 | Larsen .......................... | 123/56.8 |

(Continued)

FOREIGN PATENT DOCUMENTS

| | | |
|---|---|---|
| EP | 1637784 A1 | 3/2005 |
| EP | 1526271 B1 | 6/2007 |

(Continued)

*Primary Examiner* — William Kelleher
*Assistant Examiner* — Emily Cheng
(74) *Attorney, Agent, or Firm* — Knobbe, Martens, Olson & Bear, LLP

(57) ABSTRACT

An actuator has a rotary drive and a threaded element for converting the rotary motion of the rotary drive into a reciprocating motion of a tappet connected to a hinged wastegate and/or to a variable turbine geometry device of an exhaust gas turbocharger. The tappet and/or an axle between the tappet and the threaded element is received in at least one guide comprising at least one web and allowing for at least a slight tilting or pivoting movement of the tappet in at least one direction. At least some play is present between the web and at least one broadened portion on the tappet and/or on the axle. Methods of actuating a wastegate and/or a variable turbine geometry device.

12 Claims, 2 Drawing Sheets

(56) References Cited

U.S. PATENT DOCUMENTS

| | | | |
|---|---|---|---|
| 5,078,021 A * | 1/1992 | Freywiss | 74/490.1 |
| 5,701,741 A * | 12/1997 | Halsall | 60/602 |
| 6,007,047 A * | 12/1999 | Phipps | 251/252 |
| 6,793,194 B1 * | 9/2004 | Grinberg | 251/58 |
| 8,651,455 B2 * | 2/2014 | Albert et al. | 251/248 |
| 2003/0015048 A1 * | 1/2003 | Schmidt et al. | 74/99 R |
| 2010/0176325 A1 | 7/2010 | Klipfel et al. | |

FOREIGN PATENT DOCUMENTS

| | | |
|---|---|---|
| EP | 2169268 A2 | 3/2010 |
| JP | 2005315179 | 11/2005 |
| JP | 2006274833 | 10/2006 |
| JP | 2007262964 | 10/2007 |
| WO | 2005021954 A1 | 3/2005 |
| WO | 2009010711 A1 | 1/2009 |
| WO | 2009090131 A1 | 7/2009 |

* cited by examiner

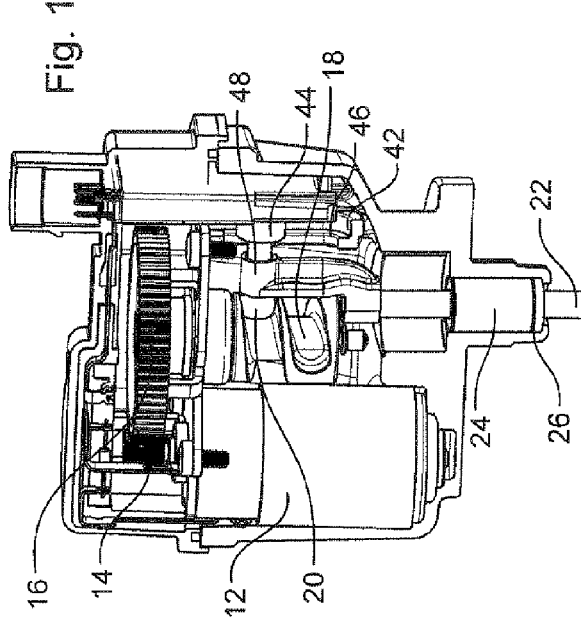
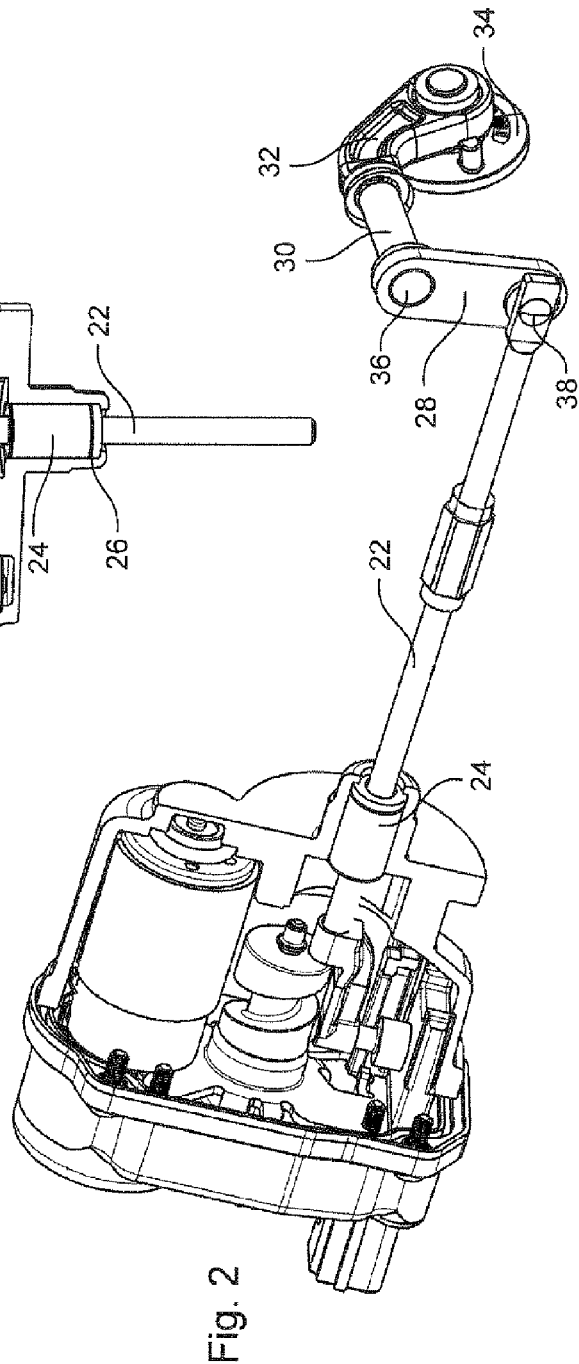

ACTUATOR FOR A WASTEGATE OR A VARIABLE TURBINE GEOMETRY DEVICE AND METHOD OF ACTUATION

RELATED APPLICATIONS

This application claims the priority of European Patent Application No. EP 10 172 629.7, filed Aug. 12, 2010, the entirety of which is hereby incorporated by reference herein.

BACKGROUND OF THE INVENTION

1. Field of the Invention

The invention relates to an actuator for a wastegate or a variable turbine geometry device and to the use of an actuator for a variable turbine geometry device of an exhaust gas turbocharger.

Exhaust gas turbochargers usually have what is referred to as a wastegate so that the hot exhaust gas is not supplied to the turbine of the turbocharger in certain situations in order to regulate the boost pressure accordingly. The wastegate may moreover be used to divert away the hot exhaust gas, e.g. in order to heat a catalytic converter and thereby reduce the pollutants emitted. The characteristic of the exhaust gas turbocharger can furthermore be adjusted by adjusting a variable turbine geometry device.

2. Description of the Related Art

Pneumatic servo-drives have generally hitherto been used as actuators in this connection.

SUMMARY OF THE INVENTION

The object of the invention is to provide an improved actuator and advantageous use of an actuator for a variable turbine geometry device of an exhaust gas turbocharger.

This problem is solved firstly by the actuator described in claim 1.

The actuator or servo-drive according to the invention has a rotary drive which firstly drives a threaded element in rotation, possibly with the interposition of suitable gearing. A tappet cooperates with the threaded element and is in engagement with the threaded element in such a manner that the rotary motion of the threaded element is converted into a reciprocating motion of the tappet. The tappet is in turn connected to the hinged wastegate and/or to a variable turbine geometry device of an exhaust gas turbocharger. The stroke generated at the tappet is therefore used to open and close the wastegate, for example.

The tappet, which is connected to a hinged wastegate or to a variable turbine geometry device, and/or an axle between the tappet and the threaded element is/are received in at least one guide comprising at least one web and allowing for at least a slight tilting or pivoting movement of the tappet in at least one direction, play being present between the web and broadened portions on the tappet and/or on the axle. In other words, the guide has one or more webs and at least one broadened portion is provided on the tappet and/or on the axle. A broadened portion of this kind can be guided between two webs and/or a web can be received between two broadened portions. Play, i.e. movability, is present in the region of this guide/receiver so that the tappet can be at least slightly tilted or pivoted.

It should be noted in this connection that the operating principle of a servo-drive described hereinabove has hitherto been used primarily in the case of valve elements moved in translation, in other words, in poppet valves, while a wastegate is usually pivoted or swung open and closed in the course of its actuation. The end point of the tappet connected to a suitable lever of the wastegate directed towards the wastegate therefore describes a circular path. The measure described hereinabove advantageously allows for the corresponding at least slight deflection of the tappet. The point at which the tappet for converting the rotary motion of the threaded element into a reciprocating motion is in engagement with the threaded element thus acts essentially as a pivot. This consequently demonstrates the advantageous compatibility of the operating principle described with a hinged wastegate. The possible deflection may be, e.g. approximately 2 mm and/or approximately ±3° in both directions. This principle may firstly make use of the play of the tappet in a guide bushing. However, a guide bushing of this kind is not strictly necessary, as the end point of the tappet on the valve side is defined by the coupling to the wastegate or to the variable turbine geometry device. In this respect, it is possible to dispense with a guide bushing on the tappet and bellows may simply be provided here. The tappet may furthermore be guided in a region between the tappet and the threaded element, in particular in the region of an axle mounted on the tappet and on which a roller for cooperating with the threaded element is preferably provided. The axle and/or the tappet can cooperate with complementary contours on a translational guide, e.g. by means of suitable steps, recesses, projections or the like. As described in more detail hereinafter with reference to the drawings, this guiding may be effected axially and/or radially and with play in all directions so as to allow for the tilting or pivoting movement described hereinabove.

The actuator described offers the advantage that it has an operating principle which is in many respects tried and tested, but has hitherto only been used in connection with exhaust gas recirculation valves. Particularly advantageous in this connection are its heat resistance, the problem-free adaptation of the stroke to particular applications, the production of high actuating forces, including the possibility of achieving non-linear force characteristics, the general low-friction and low-wear design and the possibility of using proven individual parts and components in the novel application. Other possible ways of making savings can furthermore be used in connection with this invention in that, in contrast to use with an exhaust gas recirculation valve, e.g. it is possible to dispense with a return spring, certain seals do not have to provide such a reliable seal as that required in the case of an exhaust gas recirculation valve, and more cost-effective materials can be used at certain points as a result of the lower temperatures compared to recirculated, particularly hot exhaust gas. The actuator according to the invention may furthermore be used for all linearly adjustable control elements and thus may replace, in particular, pneumatic and/or vacuum actuators or similar actuators. In particular, improved control quality can be achieved by virtue of the actuator according to the invention.

With respect to the detailed design of the actuator according to the invention, reference should be made to European Patent Application No. 08 165 906.2 and to EP 1 526 271 A1 in the name of the Applicant, the disclosure of which with respect to the design of the servo-drive is hereby wholly incorporated into the subject matter of this application. All of the measures described therein can advantageously also be used in the actuator described herein. A stroke of approximately 10 mm to 12 mm, in particular approximately 11 mm, has proven to be advantageous for use with a wastegate. The geometric conditions may furthermore be such that, e.g. an opening angle of 20° to 25°, in particular approximately 22°, is achieved for the wastegate. The position of the tappet, which may also be referred to as a rod, can advantageously be detected, e.g. by means of a particularly accurate contactless position sensor, such as, e.g. a Hall sensor.

Preferred developments of the actuator according to the invention are described in the further claims.

The threaded element preferably has at least two regions of differing pitch so that a non linear force characteristic can advantageously be achieved. For example, in initial tests, a pitch of 3 mm to 4 mm, preferably between 3.5 mm and 4 mm, in particular approximately 3.6 mm over an angular range of 80° to 120°, in particular approximately 100°, has proven to be advantageous. This comparatively fine pitch means that a particularly high actuating force can be generated at the start of the opening operation. This can be followed by a region of approximately 360° with a pitch of 10 mm to 12 mm, in particular approximately 11 mm.

If the tappet is inclined relative to the axis of the threaded element, or if, as preferred, the engagement between the tappet and the threaded element is effected in a direction substantially perpendicular to the effective surface of the threaded element, this offers the advantage that a force applied to the tappet cannot lead to unintentional rotation of the threaded element.

With respect to preventing friction, it has moreover proven to be advantageous if the tappet cooperates with the threaded element by means of at least one roller. The roller is preferably crowned so that an advantageous tilting or pivoting movement can take place not only about the axis of the roller, but also perpendicularly thereto. The roller may in this case advantageously act as a ball joint.

The invention relates furthermore to the novel use of an actuator or servo-drive comprising a rotational element and a threaded element to convert the rotary motion of the threaded element into a reciprocating motion of a tappet in order to actuate a variable turbine geometry device of an exhaust gas turbocharger. As described hereinbefore, it is thus possible to make use of a wide range of advantages in this novel application.

It should be mentioned that all of the measures described hereinbefore and hereinafter can also be used in an advantageous manner in actuators for other control elements moved in translation, such as valve tappets, the end points of which on the valve side have a defined position, and that the invention is in this respect not limited to an actuator in the field of a turbocharger and still displays its advantages, e.g. in the case of an exhaust gas recirculation valve or another valve.

BRIEF DESCRIPTION OF THE DRAWINGS

Embodiments of the invention illustrated by way of example in the accompanying drawings will now be described in more detail. In these drawings:

FIG. 1 is a perspective sectional view of an actuator according to the invention;

FIG. 2 is a perspective view of the actuator according to the invention comprising the wastegate connected thereto;

DETAILED DESCRIPTION OF THE PREFERRED EMBODIMENTS

Figure 3:
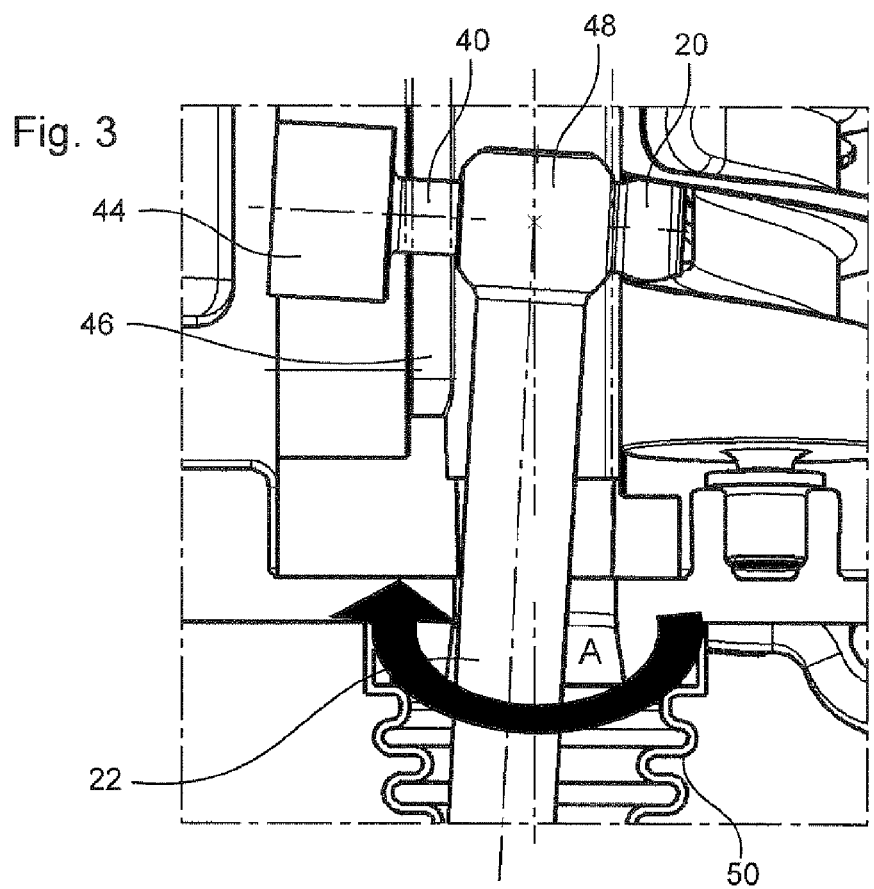
FIG. 3 is a detail view of the actuator according to the invention.

As will be clear from FIG. 1, the actuator 10 according to the invention has a rotary drive 12, the rotary motion of which being transmitted in the case shown via suitable gearing comprising a pinion 14 and a gear 16 to what is referred to as a threaded element 18. This is essentially a screw, which can also be referred to as a "worm". This screw can advantageously be guided and supported in the same housing in which the rotary drive 12 is accommodated. A separate bearing can advantageously be dispensed with. In the case shown, the threaded element 18 has approximately one and a half threads and cooperates with a roller 20 rotatably mounted on an axle 40 at the upper end of a tappet 22. As will be clear from the figure, rotation of the threaded element 18 results in a translational motion of the tappet 22, i.e. a vertical reciprocating motion according to the alignment of FIG. 1. The actuator shown in FIG. 1 is particularly adapted for the actuation of a hinged wastegate. For example, the gear 16 is made of a special material, preferably a suitable plastic or metal. A return spring can be dispensed with. Compared to the actuator or servo-drive of an exhaust gas recirculation valve, there is no need to seal the ball bearing present above (according to the alignment of FIG. 1) the threaded element 18. There is no need for a bushing in the vicinity of the roller 20. Plastic can be used as the material for the guide bushing 24 provided for the tappet 22 and sealing at the end of the guide bushing 24 directed towards the wastegate can be provided by means of a comparatively simple washer 26. Bellows (cf. FIGS. 3 and 4) may be provided in addition to the washer 26 and/or the guide bushing 24.

FIG. 1 furthermore shows a guide 42 in the region of the axle 40 on which the roller 20 is supported. The axle 40 is provided at the end opposite the roller 20 with a broadened portion 44, thereby resulting in a mushroom shape. The guide 42 is provided in an upper region (according to the representation of FIG. 1) with a web 46 extending in the direction of the translational axis, i.e. substantially parallel to the tappet 22, the web 46 extending in the region between the broadened portion 44 and the further broadened portion 48 produced by the connection of the tappet 22. This results in both axial and radial guiding (relative to the axle 40), as another web (cut away in FIG. 1) is situated opposite the web 46. It should additionally be mentioned that the guide 42 may be made entirely of plastic. The tappet 22 may furthermore extend right up to the sleeve-shaped hub forming the broadened portion 48 without, as shown in FIG. 1, a connecting piece essentially in the form of a mirror-inverted L having to be present between the tappet 22 and the broadened portion 48.

FIG. 2 shows how the tappet 22 is connected to a lever 28 connected via a hub 30 to another lever 32 on which the hinged wastegate 34 is mounted. The arrangement described consisting of the two levers 28, 32, the wastegate 34 and the hub 30 can be pivoted or hinged about the rotational axis 36. This essentially means that the end point 38 of the tappet 22 directed towards the wastegate 34 moves at least slightly in the lateral direction, i.e. substantially perpendicularly to its longitudinal extent and up and down according to the alignment of FIG. 2. This movement may advantageously be made possible by means of a suitable design of the guide bushing 24 widened towards the wastegate 34. The widening of the guide bushing 24 may be, in particular elliptical. The roller 20 advantageously acts as a pivot for this slight tilting movement about, e.g. ±3° (cf. FIG. 1).

The guide 42 is shown in detail in FIG. 3. It will furthermore be clear here that play of, e.g. a few tenths of a millimeter, in particular approximately 3 tenths of a millimeter, is advantageously present between the web 46 and the adjacent broadened portions 44 and 48 so as to allow for a tilting or pivoting movement in the direction indicated by the arrow A. This is furthermore made possible by the preferably crowned contour of the roller 20, additionally shown in FIG. 3. Radial play in the region of the axle 40 is not strictly necessary, as here the axle 40 itself acts as a rotational axis for the tilting and pivoting movements. It should additionally be mentioned that the roller 20 in general acts as a ball joint, as a tilting or pivoting movement is possible about a horizontal axis according to FIG. 3 in the region of the concrete axle 40. The corresponding degrees of freedom are furthermore made possible by the bellows 50 provided to seal the housing, these replacing the guide sleeve 24 provided with play illustrated in FIG. 1 in the embodiment shown. FIG. 3 furthermore shows the direct connection of the valve tappet 20 to the axle 40 via the broadened portion 48 acting as a hub, as a result of which the connecting piece between the broadened portion 48 and the tappet 22 shown in FIG. 1 can be dispensed with.

Figure 4:
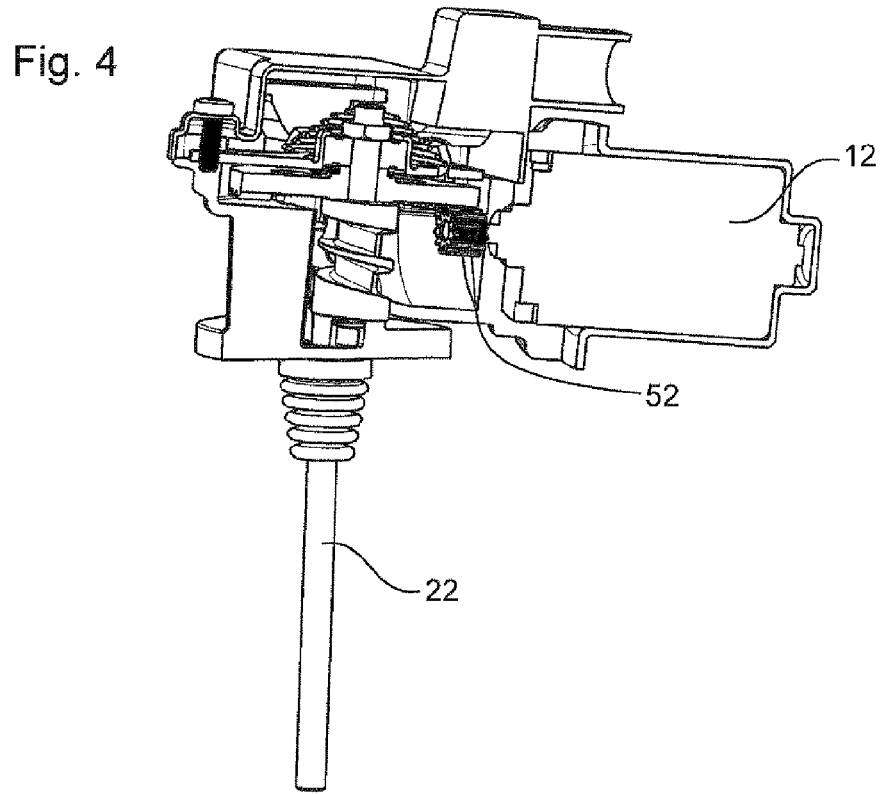
FIG. 4 is a sectional view of a second embodiment of the actuator according to the invention.

The additional embodiment shown in FIG. 4 corresponds essentially to the preceding embodiments. However, in this embodiment, the rotary drive 12 is provided in such an alignment that its rotational axis extends perpendicularly to the valve tappet 22. The gear 16 (cf. FIG. 1) is consequently provided on its underside (directed towards the tappet 22) with annular toothing cooperating with a pinion 52 of the rotary drive 12.

What is claimed is:

1. An actuator for an exhaust gas turbocharger, comprising:
    a rotary drive; and
    a threaded element for converting the rotary motion of the rotary drive into a substantially linear reciprocating motion of a tappet along a longitudinal axis of the tappet, wherein the tappet is connected to at least one of a hinged wastegate and a variable turbine geometry device of the exhaust gas turbocharger;
    an axle interposed between the tappet and the threaded element;
    wherein at least one of the tappet and the axle is received in at least one guide comprising at least one web and allowing for at least a slight tilting or pivoting movement of the tappet in at least one direction, with play being present between the web and at least one broadened portion on the tappet or the axle;
    wherein the tappet cooperates with the threaded element through at least one roller having a crowned surface that contacts the threaded element, and wherein the crowned surface allows the roller to act as a ball joint to facilitate the slight tilting or pivoting movement of the tappet.

2. The actuator according to claim 1, wherein the threaded element has at least two regions of differing pitch.

3. The actuator according to claim 1, wherein the tappet is inclined relative to an axis of the threaded element.

4. The actuator according to claim 1, wherein the tappet cooperates with the threaded element through at least one roller.

5. The actuator according to claim 1, wherein the at least one web defines an elongate guide surface and the at least one broadened portion moves relative to the elongate guide surface.

6. The actuator according to claim 1, wherein the at least one broadened portion comprises a first broadened portion on the tappet and a second broadened portion on the axle, wherein the web is positioned between the first and second broadened portions and wherein an axial length of the axle between the first broadened portion and the second broadened portion is larger than a width of the web.

7. The actuator according to claim 6, wherein the second broadened portion defines a larger cross-sectional dimension than a portion of the tappet below the at least one broadened portion.

8. The actuator according to claim 1, wherein the at least one broadened portion is located on the tappet and wherein the at least one broadened portion defines a larger cross-sectional dimension than a portion of the tappet below the at least one broadened portion.

9. The actuator according to claim 1, further comprising a lower support for the tappet, wherein the lower support is larger than a portion of the tappet passing through the lower support to enable the slight tilting or pivoting movement.

10. The actuator according to claim 9, wherein the lower support comprises a guide bushing.

11. The actuator according to claim 9, wherein the lower support comprises an opening sealed by a bellows.

12. The actuator according to claim 1, wherein the play permits the slight tilting or pivoting movement until contact between the at least one broadened portion and the web limits the slight tilting or pivoting movement, wherein the at least one broadened portion defines a cylindrical portion having a diameter that is larger than a diameter of a portion of the axle that extends across the web.

\* \* \* \* \*